United States Patent Office 3,833,607
Patented Sept. 3, 1974

3,833,607
DIALKYLAMINOPHENYLHYDRAZONES
Edgar Enders, Cologne, Ferdinand Grewe, Burscheid, and Paul-Ernst Frohberger, Leverkusen, Germany, assignors to Bayer Aktiengesellschaft, Leverkusen, Germany
No Drawing. Filed Jan. 31, 1972, Ser. No. 222,288
Claims priority, application Germany, Feb. 10, 1971, P 21 06 298.6
Int. Cl. C07d 27/08
U.S. Cl. 260—326.5 FL                5 Claims

ABSTRACT OF THE DISCLOSURE

Dialkylaminophenylhydrazones of the general formula

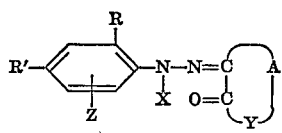

(I)

in which

A is an ethylene, propylene or butylene radical which may be substituted by alkyl of 1 to 3 carbon atoms,
X is hydrogen or acyl,
Y is oxygen, sulfur or the group >N—R'',
    R'' is hydrogen, alkyl or alkenyl with up to 12 carbon atoms, aralkyl, cycloalkyl with 5 or 6 carbon atoms, aryl optionally substituted by halogen, methyl, methoxy, or acyl,
Z is hydrogen, halogen or acylamino, or alkyl or alkoxy with up to 4 carbon atoms, and
R and R' are hydrogen, dialkylamino or a —N-hetero radical, with the proviso that R and R' are not simultaneously hydrogen, which possesses fungicidal, insecticidal, acaricidal bactericidal and yeasticidal properties.

The present invention relates to and has for its objects the provision of particular new dialkylaminophenylhydrazones, i.e. 2-oxo - 3 - [mono- or bis-(dialkylamino)-phenylhydrazono]-tetrahydrofurane or -pyrolidine or -tetrahydrothiophene, which possess fungicidal, insecticidal, acaricidal, bactericidal and yeasticidal properties, active compositions in the form of mixtures of such compounds with solid and liquid dispersible carrier vehicles, and methods for producing such compounds and for using such compounds in a new way especially for combating pests, e.g. fungi, insects, acarids, bacteria and yeasts, especcially fungi, with other and further objects becoming apparent from a study of the within specification and accompanying examples.

It is known from German Published Specification DAS 1,133,178 that 4-(dialkylamino)-phenylhydrazones of 1,2,3-tricarbonyl compounds exhibit good effectiveness against plant pathogenic fungi, in particular against *Phytophthora* species. For several reasons, however these compounds have attained no practical importance. The generally known zinc salt of ethylene-bis-dithiocarbamic acid (Compound A) remains the standard agent. The latter, however, exhibits only an inadequate curative action.

The present invention provides dialkylamino-phenylhydrazones of the general formula

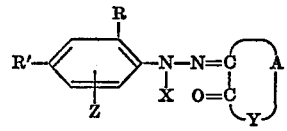

(I)

in which

A is an ethylene, propylene or butylene radical which may be substituted by alkyl of 1 to 3 carbon atoms,
X is hydrogen or acyl,
Y is oxygen, sulfur or the group >N—R'',
    R'' is hydrogen, alkyl or alkenyl with up to 12 carbon atoms, aralkyl, cycloalkyl with 5 or 6 carbon atoms, aryl optionally substituted by halogen, methyl, methoxy, or acyl,
Z is hydrogen, halogen or acylamino, or alkyl or alkoxy with up to 4 carbon atoms, and
R and R' are hydrogen, dialkylamino or a —N-hetero radical, with the proviso that R and R' are not simultaneously hydrogen.

These compounds have been found to exhibit strong fungicidal properties.
A is preferably one of the following groups:

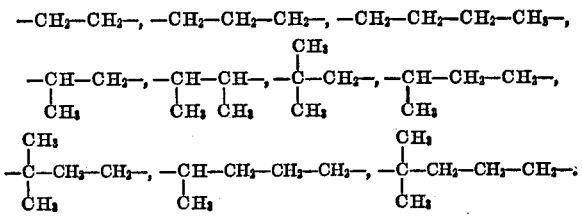

Z is preferably hydrogen, chlorine, methyl, methoxy or acetamino; R and R' are preferably hydrogen, dimethylamino, methylethyl-amino, diethylamino, methylpropyl-amino, methyl-butyl-amino or a —N-hetero radical such as pyrrolidino, piperidino or piperazino as well as one whose ring contains additional hetero atoms such as morpholino. Y is preferably oxygen or the group >N—R'', R'' standing for hydrogen, alkyl or alkenyl with up to 6 carbon atoms, benzyl, phenylethyl, cyclopentyl, cyclohexyl, phenyl, 4-chlorophenyl, 4-methylphenyl or acetyl.

The invention also provides a process for the production of a dialkylaminophenylhydrazone of the formula (I) in which a diazotized aromatic amine of the general formula

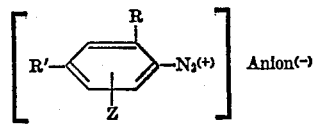

(II)

in which

Z, R and R' have the meanings stated above is coupled, i.e. reacted, with a heterocyclic compound of the general formula

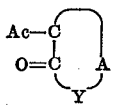

(III)

in which

A and Y have the meanings stated above, and
Ac is acyl and, optionally, the coupling product obtained is treated with an acylating agent.

Surprisingly, the dialylamino-phenylhydrazones of the general formula (I) show a considerably higher fungicidal activity than the generally known zinc salt of ethylene-bis-dithiocarbamic acid. The substances according to the invention therefore represent an enrichment of the art.

If the diazonium salt of 4-dimethylamino-aniline and 1-methyl-3-($\gamma$ - methylamino-propylcarbonyl)-pyrrolidone-(2) are used as starting materials, the reaction course can be represented by the following formula scheme:

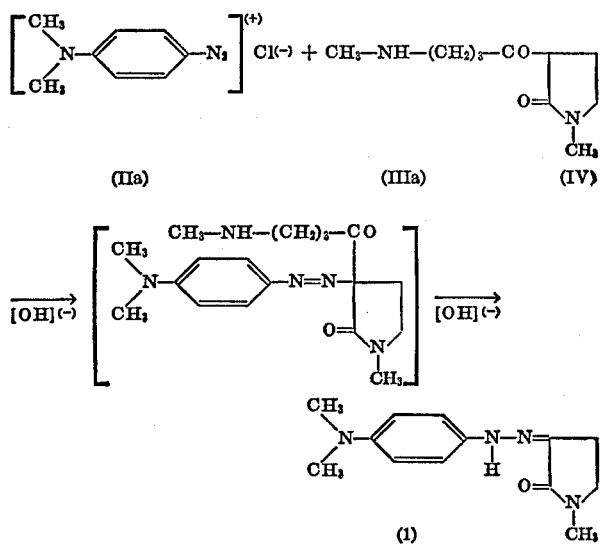

The diazotized aromatic amines to be used as starting materials are defined generally by formula (II). The compounds are known; they can be obtained by the generally known diazotization of anilines. As examples of suitable aniline derivatives there are mentioned in particular:

4-dimethylamino-aniline
4-diethylamino-aniline
4-(methyl-ethyl-amino)-aniline
4-(methyl-propyl-amino)-aniline
4-(methyl-butyl-amino)-aniline
4-pyrrolidino-aniline
4-morpholino-aniline
4-piperidino-aniline
2-dimethylamino-aniline
2,4-bis-dimethylamino-aniline
2-diethylamino-aniline
2-(methyl-ethyl-amino)-aniline
2-pyrrolidino-aniline
4-dimethylamino-2-methyl-aniline 4-dimethylamino-3-methyl-aniline
4-dimethylamino-2-methoxy-aniline
4-dimethylamino-3-chloro-aniline
4-dimethyl-3-acetamino-aniline
2-dimethylamino-3-methyl-aniline
2,4-bis-dimethylamino-5-chloro-aniline The heterocyclic coupling components to be used as starting materials are defined generally by formula (III). The compounds are for the most part known. They can be prepared for example in manner known in principle by reacting lactams with agents which split off water to give anhydro-bis-lactams and then dissolving the latter in water, $\alpha$-acyl-lactams being obtained, which can be correlated with the general formula (III). As suitable anhydro-bis-lactams which can be converted into the $\alpha$-acyl-lactams required as starting compounds by addition of water, the anhydro-bis-lactams of the following are mentioned:

pyrrolidone
N-methyl-pyrrolidone
N-ethyl-pyrrolidone
N-propyl-pyrrolidone
N-isopropyl-pyrrolidone
N-butyl-pyrrolidone
N-isobutyl-pyrrolidone
N-cyclohexyl-pyrrolidone
N-benzyl-pyrrolidone
N-phenyl-pyrrolidone
N-allyl-pyrrolidone
N-(2-methoxy-ethyl)-pyrrolidone
N-methallyl-pyrridone
N-crotyl-pyrrolidone
N-(4-chloro-phenyl)pyrrolidone
N-(4-methoxy-phenyl)-pyrrolidone
1,5-dimethyl-pyrrolidone
1,5,5-trimethyl-pyrrolidone
1-ethyl-5-methyl-pyrrolidone
1-methyl-5-phenyl-pyrrolidone
N-acetyl-pyrrolidone
N-methoxycarbonyl-pyrrolidone
N-dimethylamino-carbonyl-pyrrolidone
N-methyl-piperidone
N-ethyl-piperidone
N-allyl-piperidone
N-methyl-caprolactam
N-allyl-caprolactam Furthermore, as examples of compounds of the general formula (III), the following $\alpha$-actyl-lactams, $\alpha$-acyl-lactones and $\alpha$-acyl-thiolactones are mentioned:

$\alpha$-ethoxalyl-N-methyl-pyrrolidone
$\alpha$-ethoxalyl-N-ethyl-pyrrolidone
$\alpha$-ethoxalyl-N-phenyl-pyrrolidone
$\alpha$-ethoxalyl-N-acetyl-pyrrolidone
$\alpha$-acetyl-N-methyl-piperidone,
$\alpha$-ethoxalyl-N-methyl-piperidone
$\alpha$-acetyl-butyrolactone
$\alpha$-formyl-butyrolactone
$\alpha$-acetyl-$\gamma$, $\gamma$-dimethyl-butyrolactone
$\alpha$-ethoxycarbonyl-butyrolactone
$\alpha$-ethoxycarbonyl-$\gamma$-valerolactone
$\alpha$-acetyl-$\gamma$-valerolactone
$\alpha$-ethoxalyl-$\gamma$-thia-butyrolactone
$\alpha$-ethoxalyl-$\gamma$-thia-valerolactone A review of the preparation of these compounds is in the literature (cf. *Angew. Chem.* 71, 709 (1959)).

The reaction according to the invention may be carried out in the presence of a diluent, especially water, optionally used together with an organic solvent such as an alcohol, e.g. methanol or ethanol, a ketone, e.g. acetone, dimethyl formamide or a surface-active substance.

The reaction temperatures are normally kept within the range customary for coupling reactions. In general, the reaction is carried out at from about −5 to +25° C., preferably at 0 to 10° C.

When carrying out the process according to the invention, 1 to 1.5 moles of the heterocyclic coupling component of the formula (III) is preferably used for each mole of the diazonium salt of the formula (II). The coupling takes place chiefly in aqueous medium, with slightly acid, neutral or alkaline reaction. Intermediate products in this reaction are azo compounds which still contain the acyl radical of the α-acyl-lactam or the α-acyllactone (see formula scheme above) and which in many cases, when working under anhydrous conditions or at low temperature near the neutral point, can be isolated (cf. Houben-Weyl "Methoden der organischen Chemie," Vol. X/3, pp. 477, 522). With increase of the pH value and/or the temperature, they split off the acyl radical hydrolytically and are converted into dialkylaminophenylhydrazones of α-oxo-lactams, α-oxo-lactones or α-oxo-thiolactones. These compounds can optionally be further converted into dialkylamino-α-acyl-phenylhydrazones by treatment with carboxylic acid chlorides in the presence of organic bases such as triethylamine or by conversion into the sodium or potassium salts and their reaction with carboxylic acid chlorides.

The active compounds according to the invention exhibit a high fungitoxic activity. They possess a relatively low toxicity to warm-blooded animals; moreover, they are colorless or only slightly yellowish-colored. They can therefore be used, simply and without nuisance or hazard to workpeople, for the practical control of undesired fungal growth. Their good toleration by plants permits an application against fungal plant diseases by treatment of the standing cultivated plant or of individual parts thereof or of seed or of the cultivated soil.

Fungitoxic agents in crop protection are used for the control of fungi from the most diverse classes, such as *Archimycetes, Phycomycetes, Ascomycetes, Basidiomycetes* and *Fungi Imperfecti*.

The compounds according to the invention are of good effectiveness against parasitary fungi on above-the-soil parts of plants such as *Phytophthora* species and *Peronospora* species. Furthermore, they act particularly well against seed-borne fungi such as *Tilletia tritici* and also against soil-inhabiting fungi such as *Rhizoctonia, Fusarium, Pythium, Verticillium* and *Thielaviopsis* species. It is particularly to be emphasized that the active compounds according to the invention have a curative effect in the case of tomatoes as well as potatoes against *Phytophthora infestans*. An infection already present is halted without the host plant being damaged. This can be an important advantage in technical service.

The compounds according to the invention possess insecticidal, acaricidal, bactericidal, mold fungicidal and yeasticidal activity.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for intance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylenes, alkyl naphthalenes, etc.), halogenated, especially chlorinated, aromatic hydrocarbons (e.g. chlorobenzenes, etc.), cyclohexane, paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), ethers, amides (e.g. dimethyl formamide, etc.), sulfoxides (e.g. dimethyl sulfoxide, etc.), ketones (e.g. acetone, methyl ethyl ketone, methyl isobutyl ketone, cyclohexanone, etc.), acetonitrile, and/or water; as well as inert dispersible finely divided solid carriers, such as ground natural minerals (e.g. kaolins, clays, alumina, silica, chalk, i.e. calcium carbonate, talc, attapulgite, monomorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, insecticides, acaricides, bactericides and yeasticides, or nematocides, rodenticides, herbicides, fertilizers, growth-regulating agents, soil structure improvement agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

In the case of seed dressing, there are used, in general, amounts of active compound of about 0.01 to 10 g., preferably about 0.1 to 3 g., per kilogram of seed.

In the case of soil treatment, which can be carried out over the whole area, in strips or at points, there are required, at the place where effect is aimed at, concentrations of active compound of about 3 to 500 g. of active compound per cubic meter of soil, preferably about 10 to 100 g. per cubic meter.

In the case of treatment of above-the-soil parts of plants, the concentrations of active compound generally are from about 0.001 to 3 percent by weight, preferably about 0.002 to 1.0 percent by weight.

Furthermore, the present invention contemplates methods of selectively killing, combating or controlling pests, e.g. fungi, insects, acarids, bacteria and yeasts and more particularly methods of combating fungi, one of insects, acarids which comprises applying to at least one of correspondingly (a) such fungi, (b) such insects, (c) such acarids, (d) such bacteria, (e) such yeasts and (f) the corresponding habitat thereof, i.e. the locus to be protected, a correspondingly combative or toxic amount, i.e. a fungicidally, insecticidally, acaricidally, bactericidally or yeasticidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dry dressing, paste (slurry) dressing, moist dressing, wet dressing, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

*Phytophthora* test/curative

Solvent: 4.7 parts by weight acetone
Emulsifier: 0.3 parts by weight alkylarylpolyglycol ether
Water: 95 parts by weight The amount of active compound necessary for the desired concentration of active compound in the preparation mixture is mixed with the stated amount of solvent, and the concentrate is diluted with the stated amount of water which contains the stated additions.

From tomato plants (Bonny Best variety) pinnules are removed and these are laid with the top side facing upwards in Petri dishes the lid and bottom of which are provided with moist filter paper. The pinnules introduced are sprayed with an aqueous spore suspension of *Phytophthora infestans* and incubation is effected in closed dishes for 6 hours at 20° C. The leaves are subsequently immersed for 15 minutes in the mixture prepared as described hereinabove.

After a further incubation of 3 days at 20° C. in a closed dish, the infection on the treated pinnules is determined as a percentage of the infection of an untreated but likewise inoculated control. 0% means no infection; 100% means that the infection is exactly as great as in the case of the control.

The active compounds, the concentrations of the active compounds and the results can be seen from the following Table 1.

TABLE 1
Phytophthora test/curative

| Active compound | Infection as a percentage of the infection of the untreated control with a concentration of active compound (in percent) of— | | |
|---|---|---|---|
| | 0.1 | 0.025 | 0.0125 |
| (A) CH₂—NH—C(=S)—S \ Zn / CH₂—NH—C(=S)—S (known) | 100 | 100 | 100 |
| (1) (CH₃)₂N—C₆H₄—NH—N= ring(O=, N—CH₃) | 3 | 20 | 30 |
| (6) (CH₃)₂N—C₆H₄—NH—N= ring(O=, N—C₄H₉) | 3 | 13 | 43 |

EXAMPLE 2

Agar plate test

Test for fungitoxic effectiveness and breadth of the activity spectrum.
Solvent: Acetone
Parts by weight: (a) 1000, (b) 100

To produce a suitable preparation of the active compound, 1 part by weight of the active compound is taken up in the stated amount of solvent.

To potato dextrose agar which has been liquefied by heating there is added the preparation of the active compound in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm. diameter. The Petri dishes remain at 20° C. for 3 days for incubation.

After this time, the inhibiting action of the active compound on the mycelium growth is determined in categories, taking into account the untreated control. 0 means no mycelium growth, either on the treated substrate or on the inoculum; the symbol — means mycelium growth on the inoculum only, no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table:

TABLE 2
Agar plate test

| Active compound | Concentration of active compound in the substrate in mg./liter | Corticium rolfsii | Phytophthora cactorum |
|---|---|---|---|
| Untreated | | + | + |
| (A) (known) 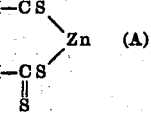 | 10<br>100 | +<br>+ | +<br>+ |
| (1) 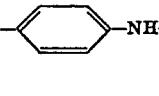 | 10<br>100 | +<br>0 | +<br>+ |
| (6) 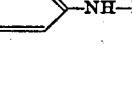 | 10<br>100 | +<br>0 | +<br>0 |
| (13) 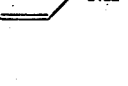 | 10<br>100 | +<br>+ | −<br>0 |
| (4)  | 10<br>100 | +<br>0 | +<br>0 |
| (7) 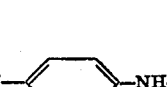 | 10<br>100 | +<br>0 | 0<br>0 |
| (9) 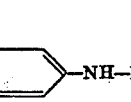 | 10<br>100 | +<br>0 | 0<br>0 |
| (5) 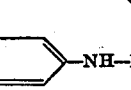 | 10<br>100 | +<br>0 | +<br>0 |
| (2) 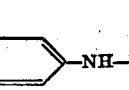 | 10<br>100 | +<br>0 | 0<br>0 |
| (3)  | 10<br>100 | +<br>0 | 0<br>0 |

EXAMPLE 3

Seed dressing test/bunt of wheat
(seed-borne mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g. of the chlamydospores of *Tilletia caries* per kg. of seed. To apply the dressing, the seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used in the percentage spore germination can be seen from the following Table 3.

TABLE 3
Seed dressing test/bunt of wheat

| Active compounds | Concentration of active compound in the dressing in percent by weight | Applied amount of dressing, g./kg. seed | Spore germination in percent |
|---|---|---|---|
| Non-dressed | | | >10 |
| 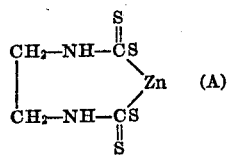 (A) (known) | 10 | 1 | 5 |
| 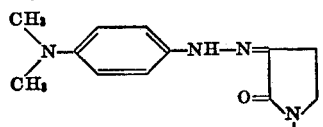 (1) | 1<br>3 | 1<br>1 | 0.005<br>0.005 |
| 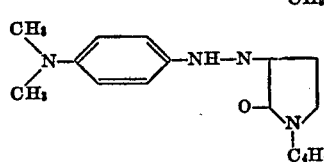 (6) | 3<br>10 | 1<br>1 | 0.05<br>0.000 |
| 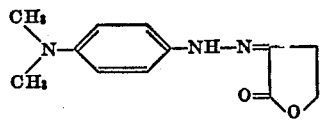 (13) | 1<br>3 | 1<br>1 | 0.5<br>0.000 |
| 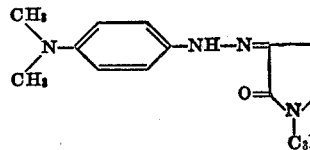 (4) | 10 | 1 | 0.000 |
| 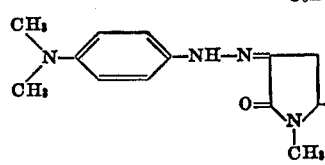 (7) | 10 | 1 | 0.000 |
| 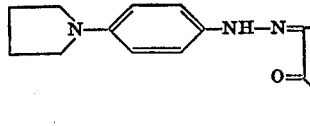 (9) | 10 | 1 | 0.000 |
| 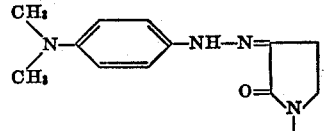 (5) | 10 | 1 | 0.005 |
| 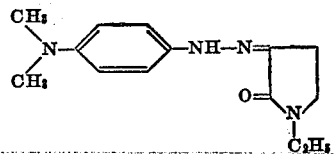 (2) | 3<br>10 | 1<br>1 | 0.005<br>0.000 |

EXAMPLE 4

Soil treating agent test/soil-borne mycoses

To produce a suitable preparation of the active compound, the active compound is extended with talc to a content of 5% and subsequently with quartz sand to a content of 0.5% of active compound.

The preparation of the active compound is uniformly mixed with Fruhstorfer standard soil, which has first been sterilized and then inoculated with pure cultures of the test fungi.

The soil is filled into 5 pots, each of which is sown with 10 seeds of the host plants. The pots are placed in a greenhouse at the stated temperatures and kept normally moist.

3 weeks after sowing, the number of healthy plants is determined as a percentage of the number of seeds sown. 0% means that no healthy plants have grown; 100% means that healthy plants have resulted from all the seeds.

The active compounds, the concentrations of the active compounds in the soil, the test fungi, host plants, greenhouse temperatures and the results obtained can be seen from Table 4:

TABLE 4

Soil treating agent test/soil-born mycosis
Test fungi: *Fusarium culmorum*
Host plant: Pea
Temperature range: 22–25°

| Active compounds | | Concentration of active compound in mg./liter soil |
|---|---|---|
| Fruhstorfer standard soil | Sterilized | |
| Untreated | | 100 |
| Fruhstorfer standard soil | Sterilized and inoculated. | |
| Untreated | | 42.5 |
| (A) structure (known) | | 100 ... 2 |
| (6) structure | | 100 ... 65 |
| (13) structure | | 100 ... 70 |

The following further examples are set forth to illustrate, without limitation, the process for producing the active compounds according to the present invention.

EXAMPLE 5

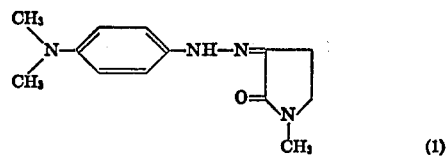

(1)

(a) 250 g. (2.5 moles) of N-methyl-pyrrolidone-(2) are dissolved in 900 ml. of chlorobenzene, 385 g. (2.5 moles) of phosphorus oxychloride are added dropwise at 20 to 30° C. and heating under reflux is subsequently effected for 2 hours. Cooling is then effected and the mixture is extracted with 3000 ml. of ice water in portions. The aqueous extract is filtered and neutralized to pH 7 at 10 to 20° C. by dropwise addition of about 600 ml. of 45%-strength solution of sodium hydroxide. 100 g. of potassium carbonate are subsequently added, yielding 1-methyl - 3 - (γ - methylaminopropylcarbonyl) - pyrrolidone-(2).

(b) Without isolation of the pre-product obtained in (a), to the aqueous solution thereof there is added dropwise a diazonium salt solution which has been prepared in customary manner from a solution of 150 g. (1.1 moles) of 4-amino-dimethyl-aniline in 1200 ml. of water and 220 ml. of concentrated hydrochloric acid, as well as a solution of 80 g. (1.16 moles) of sodium nitrite in 300 ml. of water. Subsequently, at 0 to 5° C. a further 100 ml. of 45%-strength solution of sodium hydroxide are added dropwise. After complete conversion of the diazonium salt, the precipitated reaction product is filtered off with suction, washed salt-free with water and dried in a vacuum. There are obtained 225 g. (0.915 mole) of a brown crystalline powder of m.p. 223–225° C. (with decomposition). Recrystallized from dimethyl formamide, 1-methyl-2-oxo-3-(4-dimethylamino - phenylhydrazone)-pyrrolidine is obtained in the form of pale-yellow crystals of the m.p. 236° C. (with decomposition); it dissolves in dilute hydrochloric acid. Yield: 88% of theory, based on the diazonium salt.

EXAMPLE 6

In analogous manner, the following compounds with the general formula:

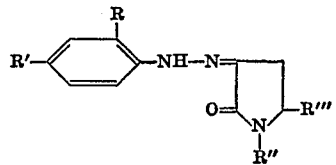

can be prepared:

| Compound | R | R' | R'' | R''' | M.P. (° C.) |
|---|---|---|---|---|---|
| (2) | H | (CH₃)₂N— | —C₂H₅ | H | ª 216 |
| (3) | H | (CH₃)₂N— | —CH₂—CH=CH₂ | H | ª 217–218 |
| (4) | H | (CH₃)₂N— | —CH₂—CH₂—CH₃ | H | ª 205 |
| (5) | H | (CH₃)₂N— | —CH(CH₃)₂ | H | ª 225 |
| (6) | H | (CH₃)₂N— | —n-C₄H₉ | H | ª 174 |
| (7) | H | (CH₃)₂N— | —CH₃ | —CH₃ | ª 229–231 |
| (8) | H | (C₂H₅)₂N— | —CH₃ | H | ª 175–177 |
| (9) | H | ⟨N—⟩ | —CH₃ | H | ª 239–240 |
| (10) | —N(CH₃)₂ | H | —CH₃ | H | 182–184 |
| (11) | —N⟨ ⟩ | H | —CH₃ | H | ª 165–167 |

ª With decomposition.

EXAMPLE 7

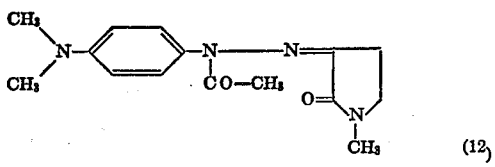
(12)

20 g. (0.815 mole) of 1-methyl-2-oxo-3-(4-dimethyl-aminophenyl-hydrazono)-pyrrolidine (produced in Example 5) are heated under reflux for 10 hours with 100 ml. of acetic anhydride and 50 g. of triethylamine. Thereafter the solvent is distilled off and the residue is recrystallized from dimethyl formamide. There are obtained 16 g. of 1-methyl-2-oxo-3-(4-dimethylamino-α-acetyl-phenylhydrazono)-pyrrolidine of the m.p. 240–242° C. (with decomposition).

Yield: 68% of theory.

EXAMPLE 8

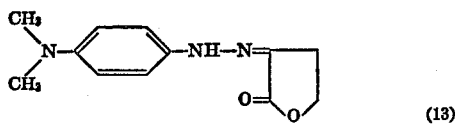
(13)

68 g. (0.5 mole) of 4-amino-dimethylaniline are dissolved in 600 ml. of water and 140 ml. of concentrated hydrochloric acid at 0° C., and diazotized in customary manner with a solution of 37 g. (0.536 mole) of sodium nitrite in 100 ml. of water. The diazonium salt solution is added dropwise at 0° C. to a solution of 64 g. (0.5 mole) of 2-oxo-3-acetyltetrahydrofurane in 300 ml. of methanol and 200 ml. of saturated aqueous potassium carbonate solution. After completion of reaction the mixture is diluted with much water, the reaction product is filtered off with suction, washed salt-free and dried in a vacuum. There are obtained 80 g. (0.344 mole) of a brownish crystalline powder; after recrystallization, the 2-oxo - 3 - (4-dimethylamino-phenylhydrazono)-tetrahydrofurane obtained is almost colorless and shows a decomposition point of 257–258° C. Yield: 69% of theory.

EXAMPLE 9

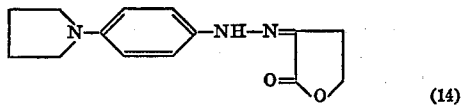
(14)

The compound of the above formula is prepared in manner analogous to that of Example 13. The melting point lies at 261–262° C. (with decomposition).

In an analogous manner, the following compounds can be prepared:

TABLE

| Compound number | Structural formula | Melting point (° C.) |
|---|---|---|
| 15 | [structure with Cl, N(CH₃)₂, NH—N, N—CH₃] | 222–223 |
| 16 | [structure with Cl, N(CH₃)₂, NH—N, O] | 204–205 |
| 17 | [morpholino-phenyl-NH—N, N—CH₃] | ª 243 |
| 18 | [morpholino-phenyl-NH—N, O] | ª 248 |
| 19 | [CH₃, N(CH₃), Cl, NH—N, N—CH₃] | ª 238–239 |
| 20 | [(CH₃)₂N⁺, Cl, NH—N, N—CH₃; CH₃OSO₃⁻] | ª 237–240 |
| 21 | [CH₃N piperazine, Cl, NH—N, N—CH₃] | ª 236–237 |
| 22 | [(CH₃)₃N⁺—phenyl—NH—N, N—CH₃; CH₃OSO₃⁻] | ª 210–215 |
| 23 | [CH₃N piperazine—phenyl—NH—N, N—CH₃] | ª 253–255 |

See footnotes at end of table.

TABLE—Continued

| Compound number | Structural formula | Melting point (° C.) |
|---|---|---|
| 24 | CH₃N⟨piperidine⟩—N—⟨C₆H₄⟩—NH—N=⟨pyrrolidinone⟩ | a 255 |
| 25 | (CH₃)₃N⁺—⟨C₆H₄⟩—NH—N=⟨N-methylpyrrolidinone⟩ CH₃OSO₃⁻ | 225 |
| 26 | (CH₃)₃N⁺—⟨C₆H₄⟩—NH—N=⟨pyrrolidinone⟩ CH₃OSO₃⁻ | a 168–177 | a Decomposition.

It will be seen from the above that the invention therefore provides a fungicidal composition containing as active ingredient a compound according to the invention in admixture with a solid or liquefied gaseous diluent or carrier or in admixture with a liquid diluent or carrier containing a surface-active agent.

The invention also provides a method of combating fungus pests which comprises applying to the pests or a habitat thereof a compound according to the invention alone or in the form of a composition containing as active ingredient a compound according to the invention in admixture with a diluent or carrier.

The invention also provides crops protected from damage by fungi by being grown in areas in which, immediately prior to and/or during the time of the growing, a compound according to the invention was applied alone or in admixture with a diluent or carrier.

It will be appreciated that the instant specification and examples are set forth by way of illustration and not limitation, and that various modifications and changes may be made without departing from the spirit and scope of the present invention.

What is claimed is:

1. A compound of the formula:

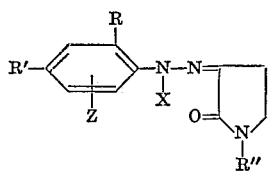

in which

X is hydrogen, formyl, acetyl, ethoxycarbonyl or ethoxalyl,

Z is hydrogen, chlorine, methyl, methoxy or acetamino,

R and R' are hydrogen, dimethylamino, methyl-ethylamino, diethylamino, methyl-propylamino, pyrrolidino, piperidino, piperazino or morpholino, and R" is hydrogen, alkyl or alkenyl with up to 6 carbon atoms, benzyl, phenylethyl, cyclopentyl, cyclohexyl, phenyl, 4-chlorophenyl, 4-methyl-phenyl or acetyl.

2. The compound according to claim 1 wherein such compound is 1-methyl-2-oxo-3-(4-dimethylamino-phenylhydrazono)-pyrrolidine of the formula

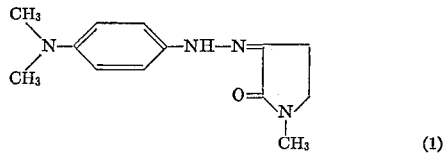

(1)

3. The compound according to claim 1 wherein such compound is 1-propyl-2-oxo-3-(4-dimethylamino-phenylhydrazono)-pyrrolidine of the formula

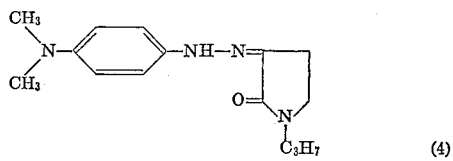

(4)

4. The compound according to claim 1 wherein such compound is 1-butyl-2-oxo-3-(4-dimethylamino-phenylhydrazono)-pyrrolidine of the formula

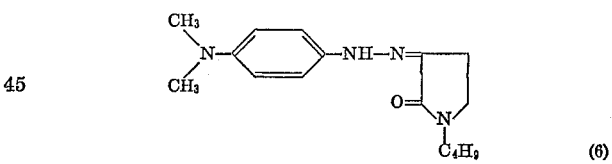

(6)

5. The compound according to claim 1 wherein such compound is 1,5-dimethyl - 2 - oxo-3-(4-dimethylamino-phenylhydrazono)-pyrrolidine of the formula

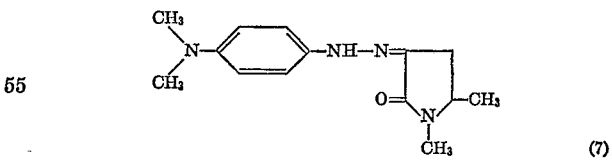

(7)

References Cited

UNITED STATES PATENTS 3,167,476   1/1965   Bonta _____ 260—326.5 XR

JOSEPH A. NARCAVAGE, Primary Examiner

U.S. Cl. X.R.

260—247.2 A, 268 Ph, 293.71, 326.41, 343.6, 326.45; 424—274